MODULAR STRUCTURES AND METHODS OF MAKING THEM

Filed April 24, 1961

INVENTORS
EDUARD LUEDICKE &
HARRY REINIG

BY Morris [signature]
Attorney

United States Patent Office 3,179,854
Patented Apr. 20, 1965

3,179,854

MODULAR STRUCTURES AND METHODS OF MAKING THEM

Eduard Luedicke, Somerville, and Harry Reinig, New Brunswick, N.J., assignors to Radio Corporation of America, a corporation of Delaware Filed Apr. 24, 1961, Ser. No. 104,868
4 Claims. (Cl. 317—101)

This invention relates generally to modular structures and to methods of making them. More particularly, the invention relates to improved modular structures of circuit networks which include conductors and to novel methods of making them so that their conductors have substantially uniform impedance characteristics, per unit of length, at ultra-high frequencies.

Circuits designed to operate at very high frequencies, in the order of a thousand magacycles per second, for example, require the use of conductors that are transmission lines with relatively uniform characteristics of inductance and capacitance to prevent unwanted phase shifts, multiple reflections, and waveform distortion. Previously, to meet these requirements, conductors of an ultra-high frequency circuit were printed on one side of a wafer of insulating material in a manner to form transmission lines with a metal backing sheet on the other side of the wafer. While such construction is satisfactory for some circuit applications, it does not eliminate or reduce cross-talk to desired low levels if the conductors are relatively close to each other. At the aforementioned very high frequencies, the dimensions of a conductor, its shielding, its insulation, and its position in the circuit are critical if unwanted phase shifts, multiple reflections, waveform distortions, and cross-talk are to be prevented.

Accordingly, it is an object of the present invention to provide improved circuit arrangements which are markedly free from, and may even obviate, the aforementioned disadvantages of the prior art, as well as novel methods of forming such circuits.

It is another object of the present invention to provide novel methods of making modular circuit structures so that their conductors will constitute shielded transmission lines having substantially uniform impedance characteristics.

Still another object of the present invention is to provide improved modular structures of ultra-high frequency circuit networks wherein cross-talk, multiple reflections, waveform distortion, and unwanted phase shifts are either reduced to desired low levels or prevented entirely.

A further object of the present invention is to provide novel modular structures of ultra-high frequency circuit networks wherein the conductors form shielded transmission lines with a metallic circuit-supporting sheet.

Still a further object of the present invention is to provide novel modular structures of ultra-high frequency networks that are relatively simple in construction, physically compact so as to require a minimum of space, and highly efficient in use in systems such as high-speed computers.

In accordance with the present invention, the improved modular structure comprises a circuit network fixed with respect to a supporting sheet of electrically conductive material and insulated therefrom. The circuit network comprises conductors lying substantially in a plane. The conductors are separated from the supporting sheet by insulation whose two-dimensional configuration is substantially that of the circuit network. After the circuit components are connected to appropriate conductors, the components and the conductors are surrounded with a hardenable fluid of insulating material. After this fluid has hardened, the insulating material is coated with a layer of electrical conductive material that extends to the supporting sheet, making electrical contact with the supporting sheet. Thus, each of the conductors forms a shielded transmission line with its associated conductive layer and the supporting sheet.

The novel features of the present invention, both as to its organization and method, as well as additional objects and advantages thereof, will be understood more fully from the following more detailed description, when read in connection with the accompanying drawing in which similar reference characters designate similar parts throughout, and in which.

Figure 1:
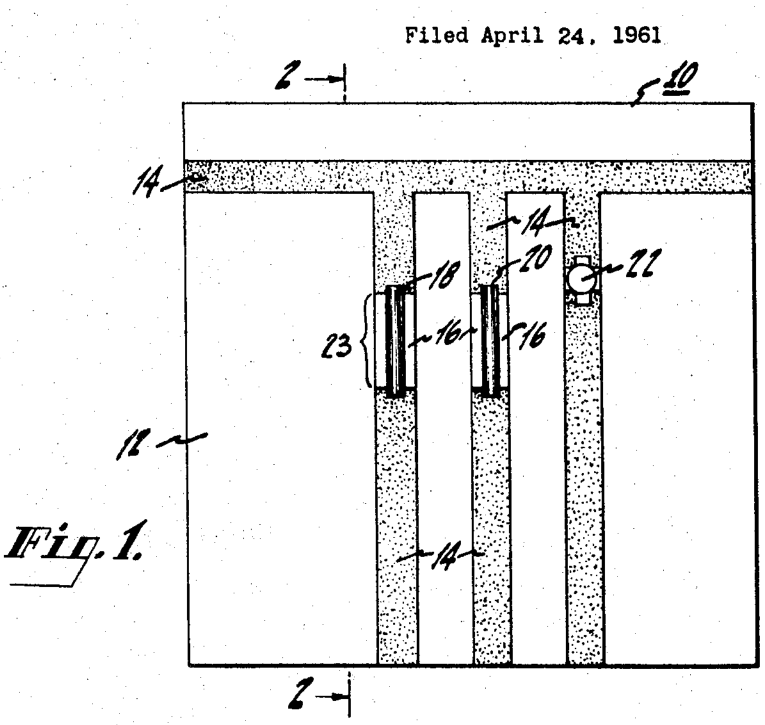
FIG. 1 is a plan view of a partly completed moular structure, in one of the stages of formation, in accordance with the present invention.
Figures 2, 3:
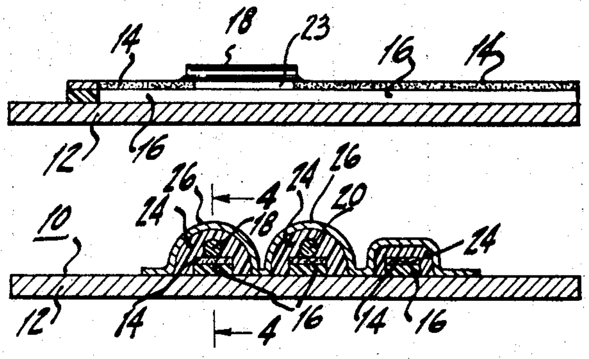
FIG. 2 is a cross-sectional view of the modular structure taken along the line 2—2 of FIG. 1 and viewed in the direction indicated by the appended arrows.
FIG. 3 is a cross-sectional view of one form of a completed modular structure in accordance with the present invention taken along the line 3—3 of FIG. 4 and viewed in the direction indicated by the appended arrows.

Referring, now , particularly to FIGS. 1 and 2, there is shown a modular structure 10 of an ultra-high frequency network of the type useful in some high-speed electronic computers, for example. Structure 10 comprises a supporting sheet 12 of electrically conductive material. The sheet 12 may be a sheet of copper, 20 mils in thickness, for example. Electrical conductors 14, comprising the conductors of the circuit network of the structure 10, lie in one plane and are insulated from the sheet 12 by electrically insulating material 16. The insulating material 16 has substantially the same two-dimensional configuration as the circuit network in a plane parallel to that of the sheet 12.

The conductors 14 and insulating material 16 may be cut simultaneously from a metal coated sheet of plastic material, such as a copper-clad sheet of "Teflon." A sheet of "Teflon" 10 mils in thickness, for example, may be coated with a layer of copper 2 mils thick. The insulating material 16 may be adhered to the supporting sheet 12 by any suitable adhesive, such as cement. Alternatively, the conductors 14 may comprise electrically conductive paint and the insulating material may be electrical insulating paint. The conductive paint may be applied over the insulating paint, both paints being applied to the sheet 12 by the silk screen method.

Electrical components, such as resistors 18 and 20 and a tunnel diode 22, for example, are connected between appropriate conductors 14 to form a desired high-frequency network. When the conductors 14 comprise a continuous coating of metal on the insulating material 16, one or more portions thereof can be scraped away to form gaps 23 in the circuit, and an appropriate component is electrically connected to the conductor portions 14 that define the various gaps, thereby completing the circuit. Thus, looking at FIG. 2, it will be seen that the resistor 18 is electrically connected in series with one of the conductors 14. The electrical components 18, 20 and 22 may be connected to the conductors 14 by any suitable electrical connecting means, such as solder, electrically conductive epoxy paste, and the like. While the conductors 14, separated from the supporting sheet 12 by the insulating material 16, form transmission lines with the supporting sheet 12, there would be cross-talk between closely spaced conductors 14 if the conductors 14 were not shielded from each other.

In order to eliminate, or at least reduce, this cross-talk, each of the conductors 14 is surrounded with an electrically conductive shield, the latter being connected to a common connection, such as the supporting sheet 12.

Figure 4:
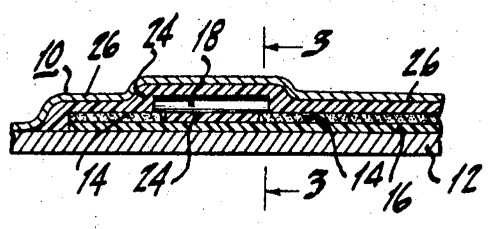
FIG. 4 is a fragmentary, sectional view of the modular structure taken along the line 4—4 of FIG. 3 and viewed in the direction indicated by the appended arrows.

Referring, now, to FIGS. 3 and 4, means are shown for making each conductor 14 into a transmission line of substantially the same characteristic impedance. To this end, the conductors 14 and any components connected thereto, are surrounded uniformly with an electrically insulating material 24. The insulating material 24 may be a hardenable epoxy fluid, such as a thixotropic epoxy, that is applied uniformly over each conductor 14, as well as over the electrical components connected to the conductors 14.

When the fluid has been hardened, or cured, the insulating material 24 is covered with a layer of electrical conductive material 26. The layer 26 may be a coating of conductive paint, metal foil, or electrodeposited metal that makes electrical contact with the backing sheet 12. Thus, such electrical conductor 14 is completely surrounded by electrical conducting material which forms an electrical shield that is separated from the conductors 14 by the insulating material 24.

If the conductors 14 are substantially similar, and if the conductive layer 26 is substantially uniform and separated from each conductor 14 by a susbtantially uniform amount of insulating material 24, the transmission lines formed by the conductors 14, the layer 26 and supporting sheet 12 will have substantially uniform impedance characteristics throughout. As such, they would possess uniform characteristics of inductance and capacitance, per unit of length, at high frequencies, and they would tend to reduce, or prevent entirely, crosstalk, multiple reflections, waveform distortion, and unwanted phase shifts.

From the foregoing description, it will be apparent that there have been provided improved, modular, circuit networks that largely overcome disadvantages of prior art circuit networks, with respect to ultra-high frequency operation, and novel methods of forming such networks. Variations in these networks or modular structures, as well as variations in the methods of making the same, coming within the spirit of the invention will, no doubt, readily suggest themselves to those skilled in the art. Hence, it is desired that the foregoing shall be considered merely as illustrative and not in a limiting sense.

What is claimed is:

1. A modular structure comprising a supporting sheet of electrically conductive material, a circuit network having conductors lying in a plane, means fixing said conductors to said supporting sheet and insulating them therefrom, insulating material covering said conductors and extending to said supporting sheet on opposite sides of said conductors, and electrically conductive material covering said insulating material, said last-mentioned conductive material extending to said supporting sheet on opposite sides of said conductors and making electrical contact with said supporting sheet whereby to form shielded transmission lines with said conductors.

2. A modular structure comprising a supporting sheet of electrically conductive material, a circuit network having conductors lying in a plane and electrical components electrically connected thereto, means fixing said circuit network to said supporting sheet and insulating it therefrom, a hardened fluid of insulating material covering said circuit network and extending to said supporting sheet on opposite sides of said circuit network, an electrically conductive coating covering said insulating material, said coating extending to said supporting sheet on opposite sides of said circuit network and making electrical contact with said supporting sheet whereby to form shielded transmission lines with said circuit network.

3. A modular structure comprising a supporting sheet of electrically conductive material, a circuit network having conductors lying in a plane, first insulating material having substantially the same two-dimensional configuration as said conductors and adhering to said conductors, means adhering said first insulating material to said supporting sheet so that said circuit network is insulated therefrom, second insulating material covering said circuit network and said first insulating material, and a metallic coating covering said second insulating material and making electrical contact with said supporting sheet on opposite sides of each of said conductors whereby to form transmission lines with said conductors.

4. A modular structure comprising a supporting sheet of electrically conductive material, a circuit network comprising components and conductors lying in substantially one plane, first insulating material formed from a flat sheet and having substantially the same two-dimensional configuration as said circiut network, means adhering said first insulating material to said supporting sheet, said circuit network being fixed to said first insulating material, second insulating material covering said circuit network and said first insulating material, said second insulating material comprising a hardened fluid extending to said supporting sheet on opposite sides of said components and said conductors, and a metallic coating covering said second insulating material and making electrical contact with said supporting sheet on opposite sides of each of said components and said conductors, said coating and said supporting sheet forming transmission lines with said conductors, and said transmission lines having substantially the same electrical characteristics.

References Cited by the Examiner

UNITED STATES PATENTS

| | | | |
|---|---|---|---|
| 2,634,310 | 4/53 | Eisler | 317—101 |
| 2,920,245 | 1/60 | Anderson | 317—101 |
| 2,923,860 | 2/60 | Miller | 317—101 |
| 3,102,213 | 8/63 | Bedson et al. | 317—100 |

FOREIGN PATENTS

| | | |
|---|---|---|
| 215,968 | 7/58 | Australia. |

JOHN F. BURNS, *Primary Examiner.*

SAMUEL BERNSTEIN, *Examiner.*